United States Patent [19]

Kajimoto et al.

[11] 4,423,452
[45] Dec. 27, 1983

[54] MAGNETIC RECORDING MEDIUM

[75] Inventors: Norifumi Kajimoto; Yoshio Kawakami; Kinji Sasaki, all of Tokyo, Japan

[73] Assignee: TDK Electronics Co., Ltd., Tokyo, Japan

[21] Appl. No.: 281,397

[22] Filed: Jul. 8, 1981

[51] Int. Cl.³ .............................................. G11B 5/62
[52] U.S. Cl. .................................. 360/131; 360/134; 252/62.59; 427/132; 428/694
[58] Field of Search ............... 360/131, 134, 135, 136; 428/900, 692, 694, 425.9; 252/62.51, 62.55, 62.59; 427/127, 128, 132

[56] References Cited

U.S. PATENT DOCUMENTS

| 4,072,781 | 2/1978 | Shirahata et al. | 360/131 X |
| 4,167,582 | 9/1979 | Takahashi et al. | 360/131 X |
| 4,315,052 | 2/1982 | Takahashi et al. | 360/134 X |

*Primary Examiner*—Robert L. Richardson
*Attorney, Agent, or Firm*—Oblon, Fisher, Spivak, McClelland & Maier

[57] ABSTRACT

A magnetic recording medium comprises a substrate coated with a magnetic layer comprising a magnetic powder and a fine titanium oxide powder having a particle diameter of at least $0.4\mu$ and at least one other fine hard non-magnetic powder.

5 Claims, 6 Drawing Figures

MAGNETIC RECORDING MEDIUM

BACKGROUND OF THE INVENTION

1. Field of the Invention

The present invention relates to a magnetic recording medium. More particularly, it relates to a magnetic recording medium which has an improved still characteristic.

2. Description of the Prior Arts

One of the important characteristics required for a magnetic recording medium is a still characteristic. In order to impart excellent still characteristic in a recording and reproducing operation of a video tape recorder, it is necessary to prevent the wearing of the surface of the tape by a head of the video tape recorder. In one system, during the still reproducing operation, two magnetic heads are placed with a gap of 180 degree to a rotary drum and are rotated at high speed with a tape in a circular loop form to perform a scanning. In this system, if the wearing resistance of the tape is not satisfactory, the surface of the tape is gradually scooped out to shorten the still reproducing time. Therefore, it is necessary to prevent a wearing of the tape under the magnetic head scanning at high speed whereby the still reproducing time is prolonged.

Heretofore, in order to improve the still characteristic, it has been proposed to incorporate a hard non-magnetic powder which is harder than a magnetic powder in a coated layer of the magnetic tape. The typical conventional hard non-magnetic powders are as follows:

Oxides: $Al_2O_3$, $SiO_2$, $Cr_2O_3$, $CeO_2$, BeO, ZrO, $TiO_2$;
Carbides: $B_4C$, SiC
Nitrides: TiN, $Si_2N$, BN, AlN;
Metal: Zr The wearing resistance of the magnetic tape having the magnetic layer containing such hard non-magnetic powder has been improved. Recently, a narrow track head has been used for imparting high recording density, serious requirement for shortening a reproducing time has been noted. As a reference, the relations of the reproducing outputs and the reproducing times for a head having a width of $100\mu$ and a head having a width of $60\mu$ are shown in FIG. 1. The reproducing time for the head having a width of $60\mu$ is remarkably shortened. It has been required to used fine magnetic powder having smaller particles. This is disadvantageous for the still characteristic. In order to overcome such disadvantages, it has been required to improve the still characteristic by further improvement of the wearing resistance of the type as the magnetic recording medium.

SUMMARY OF THE INVENTION

It is an object of the present invention to provide a magnetic recording medium having an improved still characteristic resulted by further improvement of a wearing resistance.

The foregoing and other objects have been attained by providing a magnetic recording medium which comprises a substrate coated with a magnetic layer comprising a magnetic powder and a fine titanium oxide powder having a particle diameter of at least $0.4\mu$ and at least one of other fine hard non-magnetic powders.

DETAILED DESCRIPTION OF THE PREFERRED EMBODIMENTS

The inventors have studied fine abrasive powders which are incorporated into a coated magnetic layer of the magnetic tape and have found the fact that when titanium oxide powder is combined with the other hard non-magnetic powder, unique effect for characteristic of the wearing resistance of the tape is imparted and the particle diameter of the titanium oxide powder is important factor and a fine titanium oxide powder having a particle diameter of at least $0.4\mu$ is quite effective.

The other abrasive powders used in the combination of the fine titanium oxide powder can be one or more of the conventional hard non-magnetic powders such as aluminum oxide, silicon oxide, chromium oxide, cerium oxide, beryllium oxide, zirconium oxide, boron carbide, silicon carbide, titanium nitride, silicon nitride, boron nitride, aluminum nitride and zirconium. It is preferable to incorporate at least one of alumina, chromium oxide, silicon oxide, cerium oxide, beryllium oxide, boron carbide, silicon carbide and zirconium. The typical combination is alumina-titanium oxide or chromium oxide-titanium oxide.

It is important to use the fine titanium oxide powder having a paticle diameter of at least $0.4\mu$. It is found, as shown in Examples that higher effect is imparted by the use of the fine titanium oxide having larger particle diameter. If the particle diameter is too large, certain adverse effect is caused for electromagnetic characteristics and an adverse effect is also caused for wearing of a head. Therefore, it is preferable to be upto $2\mu$ as the particle diameter of the fine titanium oxide powder. If the particle size of the other hard non-magnetic powder used with the fine titanium oxide powder is too small, the improvement of the still characteristic is not found, whereas it it is too large, said adverse effects are caused. Therefore, the particle diameter of the other hard non-magnetic powder is preferably in a range of 0.1 to $2\mu$.

The hard powders are non-magnetic powders. Therefore, when a total content of the mixture of the hard non-magnetic powders in the coated magnetic layer is too much, the electromagnetic characteristics are inferior.

Figure 1:
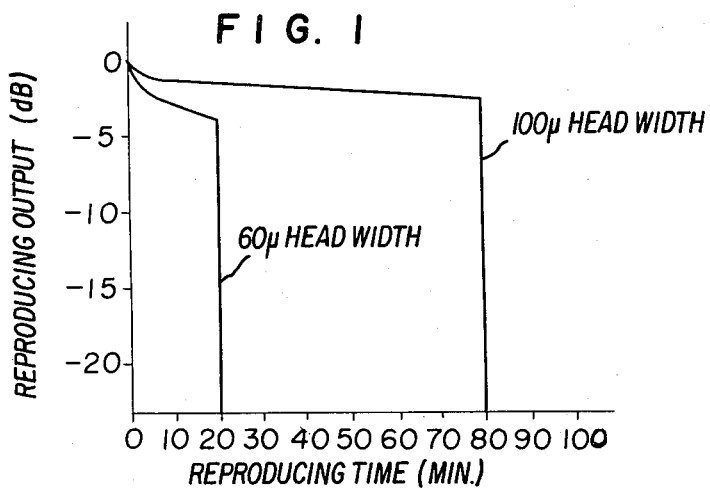
FIG. 1 is a graph showing a relation of widths of heads and reproducing outputs (at 20° C.; 60% HR; Standard I type VTR (video tape recorder)
Figure 2:
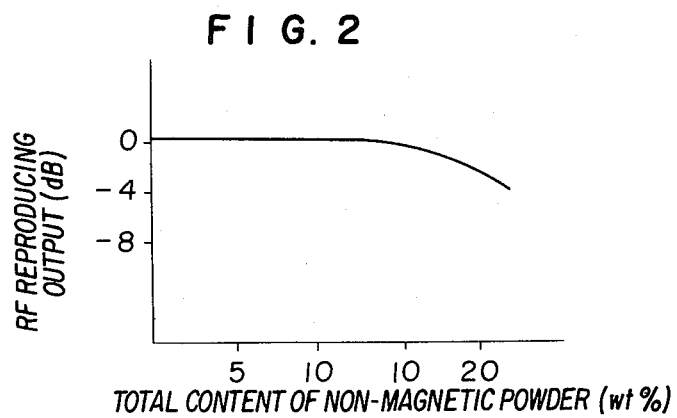
FIG. 2 is a graph showing a relation of ratios of fine hard non-magnetic powders to a magnetic powder and reproducing outputs.

FIG. 2 is the graph showing the relation of ratios of the hard non-magnetic powders to the magnetic powder and high frequency reproducing outputs. As it is found from the graph, it is preferable to be upto 20 wt.% of the hard non-magnetic powders based on the magnetic powder. In the graph, the fine titanium oxide powder having a particle diameter of $1.0\mu$ is used as the non-magnetic powder. The same tendency is found in the combination of the fine titanium oxide having different particle diameters or the combination of the fine titanium oxide and the other hard non-magnetic powder.

Radios of the fine titanium oxide powder to the other hard non-magnetic powder in the limitation of the total content of the hard non-magnetic powders are depending upon a kind and a particle diameter of the other hard non-magnetic powder, and it is selected so as to impact the optimum wearing resistance of the tape. In the selection, it is important to consider so as to prevent adverse effects such as a wearing of the head and a deterioration of the electromagnetic characteristics of the tape.

In the incorporation of the mixture of the titanium oxide powder and the other hard non-magnetic powder in the coated magnetic layer, the magnetic powder is mixed with the conventional binder and the mixture of the titanium oxide powder and the other hard non-magnetic powder is admixed or the magnetic powder, the titanium oxide powder and the other hard non-magnetic powder are mixed with the binder to knead them, if necessary, a desired crosslinking agent and an additive are admixed to prepare a magnetic powder composition and the magnetic powder composition is coated on a substrate by the conventional process.

The magnetic powders, the binders and the substrates are described in many patents and patent applications filed by the applicant. The descriptions of these details are referred in the understanding of the present invention.

The present invention will be further illustrated by certain examples and references which are provided for purposes of illustration only and are not intended to be limiting the present invention.

EXAMPLE 1

A magnetic powder composition comprising the following components was prepared. As the hard non-magnetic powder combined with the titanium oxide powder, alumina was selected and was incorporated at a ratio of 2 wt.% based on the magnetic powder.

| | |
|---|---|
| Cobalt-adsorbed iron oxide magnetic powder | 400 g. |
| Nitrocellulose | 30 g. |
| Polyvinyl chloride type resin | 15 g. |
| Urethane elastomer | 40 g. |
| Carbon | 20 g. |
| Alumina | 8 g. |

Each fine titanium oxide powder having different particle diameter was incorporated in the basical composition at each content to prepare each magnetic powder composition, and isocyanate type crosslinking agent was added to it and each magnetic powder composition was coated on a polyester film to form a layer having a thickness of about $5\mu$ to prepare each magnetic tape.

Figure 3:
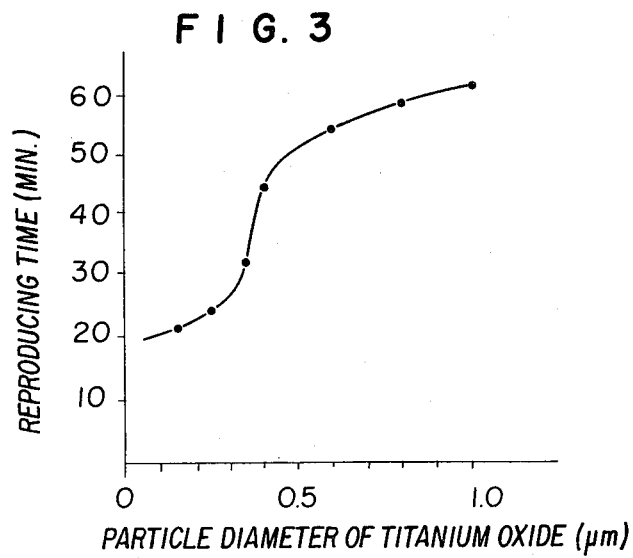
FIG. 3 is a graph showing a relation of particle sizes of titanium oxide powders in the alumina-titanium oxide powder system and reproducing times.

FIG. 3 is the graph showing the relation of the particle diameters of each fine titanium powder and the reproducing times (still characteristic) at a ratio of the fine titanium oxide powder to the magnetic powder of 5 wt.%.

It is found that the reproducing time curve rises from the particle diameter of $0.4\mu$.

Figure 4:
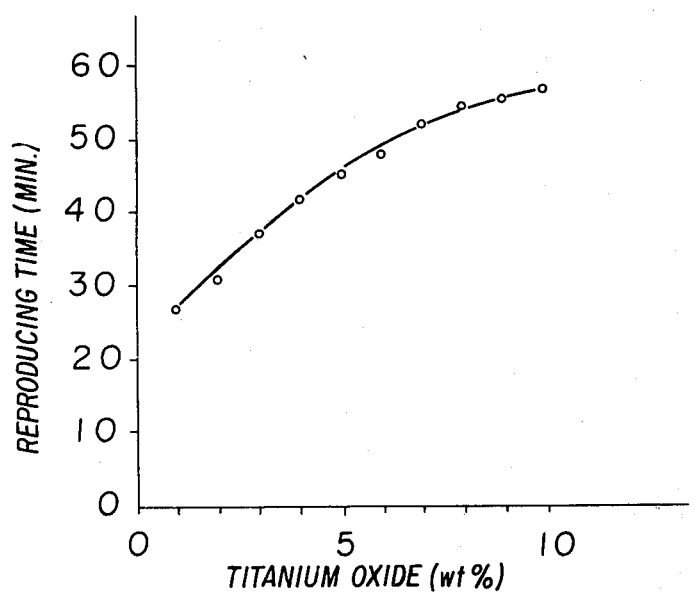
FIG. 4 is a graph showing a relation of contents of titanium oxide powder in the alumina-titanium oxide powder system and reproducing times.

FIG. 4 is the graph showing the relation of the ratio of the fine titanium oxide powder having a particle diameter of $0.4\mu$ to the magnetic powder and the reproducing time (still characteristic). The reproducing time is prolonged depending upon an increase of the content of the fine titanium oxide powder.

The still characteristic is remarkably improved by incorporating a large amount of the fine titanium oxide powder having large particle diameter.

EXAMPLE 2

In accordance with the process of Example 1 except using boron carbide powder, silicon carbide powder, zironium, silicon oxide, cerium oxide, beryllium oxide or chromium oxide instead of alumina used as the hard non-magnetic powder in combination with the fine titanium oxide powder, each test was carried out. The same tendencies as those of FIGS. 3 and 4 were found in every combinations though absolute values were slightly different. Among these combinations, the results of the combinations of the chromium oxide with the titanium oxide are shown in FIGS. 5 and 6.

Figure 5:
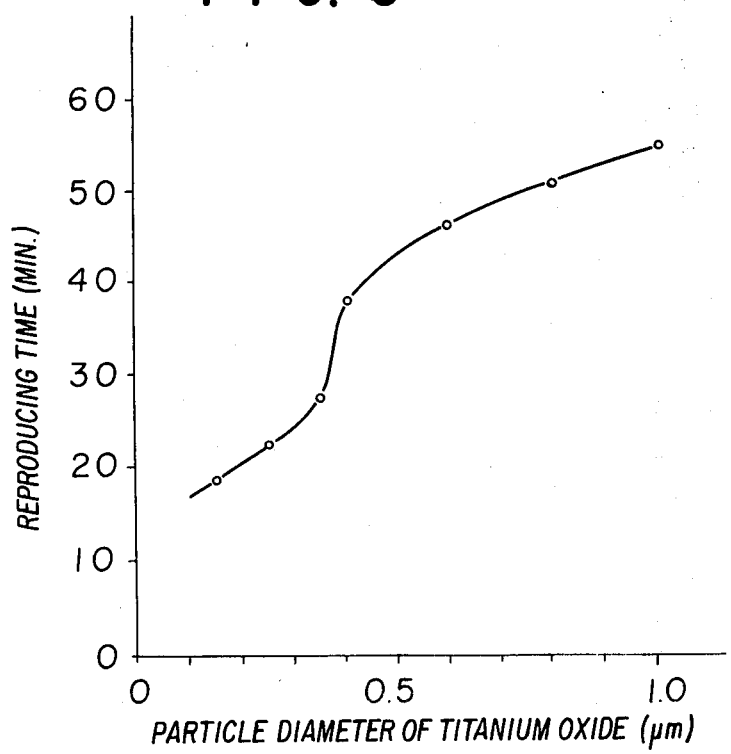
FIG. 5 is a graph showing a relation of particle sizes of titanium oxide powders in the chromium oxide-titanium oxide powder system and reproducing times.

FIG. 5 is the graph showing the relation of the variation of particle diameter of the titanium oxide powder in the combination of 8 g. of the chromium oxide powder and 20 g. of the titanium oxide powder and the reproducing time.

Figure 6:
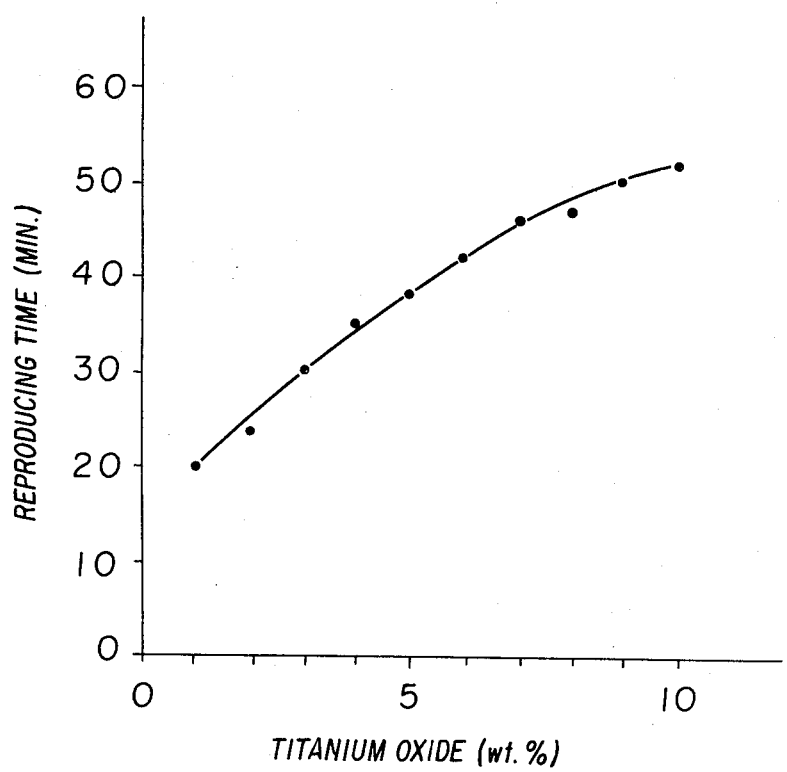
FIG. 6 is a graph showing a relation of contents of titanium oxide powder in the chromium oxide-titanium oxide powder system and reproducing times.

FIG. 6 is the graph showing the relation of the variation of a content of the titanium oxide powder having a particle diameter of $0.4\mu$ in the combination of 8 g. of the chromium oxide powder and the reproducing time.

EXAMPLE 3

In accordance with the process of Example 1 except using the same amount of polyester resin instead of polyvinyl chloride type resin in the magnetic powder composition, each magnetic tape was prepared.

The same still reproducing time characteristics were the same as FIGS. 3 and 4.

In accordance with the process of Example 1 except that nitrocellulose was eliminated from the magnetic powder composition, each magnetic tape was prepared and tested. The results are the same as Example 1.

In accordance with the process of Example 1 except that the isocyanate type crosslinking agent was eliminated, each magnetic tape was prepared by the thermoplastic binders and tested. The still characteristics were slightly inferior, however, the still characteristic tendencies were the same as FIGS. 3 and 4.

In accordance with the process of Example 1 except using each of the conventional thermoplastic resins, thermosettable resins, reactive resins or mixtures thereof instead of the binder of Example 1, each magnetic tape was prepared and still characteristics were tested. The still characteristics were slightly different, however, the still characteristic tendencies were the same as FIGS. 3 and 4.

EXAMPLE 4

In accordance with the process of Example 1 except using $\gamma$-$Fe_2O_3$ powder, $Fe_3O_4$ powder, Co-adsorbed $Fe_3O_4$ powder, a magnetic alloy powder or a mixture thereof instead of Co-adsorbed iron oxide magnetic powder, each magnetic tape was prepared and the still characteristics were tested. The results were the same as FIGS. 3 and 4.

As described above, in accordance with present invention, the still characteristics of the magnetic recording medium are improved in view of unique characteristics of the fine titanium oxide powder having a particle diameter of at least $0.4\mu$ to the still characteristics resulted by the wearing resistance of the coated magnetic layer of the magnetic recording medium. This is quite important in the field of the high recording density magnetic tapes which will especially required in feature.

The still characteristic was evaluated by each reproducing time for lowering the reproducing output to $-6$ dB.

We claim:

1. A magnetic recording medium which comprises a substrate coated with a magnetic layer comprising a magnetic powder and a fine titanium oxide powder having a particle diameter of at least $0.4\mu$ and at least one other fine hard non-magnetic powder.

2. The magnetic recording medium according to claim 1 wherein the content of said fine titanium oxide powder is in a range of up to 20 wt.% based on said magnetic powder.

3. The magnetic recording medium according to claim 1 wherein said other fine hard non-magnetic powder is at least one of alumina, chromium oxide, silicon oxide, cerium oxide, beryllium oxide, boron carbide, silicon carbide and zirconium.

4. The magnetic recording medium according to claim 1 wherein said fine titanium oxide powder has a particle diameter of 0.4 to $2\mu$.

5. The magnetic recording medium according to claim 1 wherein the total content of said hard non-magnetic powders is in a range of 0.5 to 20 wt.% based on said magnetic powder.

* * * * *

UNITED STATES PATENT AND TRADEMARK OFFICE
CERTIFICATE OF CORRECTION

PATENT NO. : 4,423,452
DATED : DECEMBER 27, 1983
INVENTOR(S) : Norifumi Kajimoto et al It is certified that error appears in the above-identified patent and that said Letters Patent is hereby corrected as shown below:

On the title page;

-- [30] Foreign Application Priority Data

Japanese..........96267 July 16, 1980--

Signed and Sealed this

Twenty-ninth Day of October 1985

[SEAL]

Attest:

DONALD J. QUIGG

*Attesting Officer*

*Commissioner of Patents and Trademarks—Designate*